US010611229B2

(12) United States Patent
Ohnemus

(10) Patent No.: US 10,611,229 B2
(45) Date of Patent: Apr. 7, 2020

(54) HYBRID DRIVE MODULE

(71) Applicant: Bayerische Motoren Werke Aktiengesellschaft, Munich (DE)

(72) Inventor: Ulrich Ohnemus, Hattenhofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 128 days.

(21) Appl. No.: 15/985,875

(22) Filed: May 22, 2018

(65) Prior Publication Data
US 2018/0264925 A1    Sep. 20, 2018

Related U.S. Application Data

(63) Continuation of application No. PCT/EP2016/076492, filed on Nov. 3, 2016.

(30) Foreign Application Priority Data

Nov. 23, 2015    (DE) .................... 10 2015 223 118

(51) Int. Cl.
*B60W 10/08*        (2006.01)
*B60K 6/30*         (2007.10)
(Continued)

(52) U.S. Cl.
CPC ............ *B60K 6/365* (2013.01); *B60K 6/40* (2013.01); *B60K 6/405* (2013.01); *B60K 6/48* (2013.01);
(Continued)

(58) Field of Classification Search
CPC .............. B60K 6/365; B60K 6/405; B60K 2006/4825; B60W 10/08; F16H 2001/2881; F16H 2200/2007
See application file for complete search history.

(56) References Cited

U.S. PATENT DOCUMENTS 5,513,719 A      5/1996  Moroto et al.
7,255,186 B2 *   8/2007  Wakuta ................. B60K 6/365
                                                    180/65.21
(Continued)

FOREIGN PATENT DOCUMENTS

DE    10 2007 036 098 A1    2/2009
DE    10 2008 040 497 A1    1/2010
(Continued)

OTHER PUBLICATIONS

International Search Report (PCT/ISA/210) issued in PCT Application No. PCT/EP2016/076492 dated Mar. 7, 2017 with English translation (five pages).
(Continued)

*Primary Examiner* — Bryan A Evans
(74) *Attorney, Agent, or Firm* — Crowell & Moring LLP

(57) ABSTRACT

A hybrid drive module for a motor vehicle is provided. The hybrid drive module includes a planetary gear stage with a sun gear, a ring gear, a planetary gear carrier and at least one planetary gear that is rotatably mounted with respect to the planetary gear carrier. The hybrid drive module also includes an electric drive machine having a stator and a rotor. The ring gear and the rotor, and the planetary gear carrier and a separation clutch can be connected in a torque-conducting manner. The separation clutch is configured to interrupt the torque transfer to the planetary gear carrier, and the ring gear is arranged in the radial and axial directions at least in sections inside the rotor. The planetary gear carrier is mounted with the axial bearing and the radial bearing in a rotatable manner with respect to the housing.

20 Claims, 1 Drawing Sheet

(51) Int. Cl.
*B60K 6/40* (2007.10)
*B60K 6/365* (2007.10)
*B60K 6/48* (2007.10)
*B60K 6/405* (2007.10)
*F16H 1/28* (2006.01)

(52) U.S. Cl.
CPC ..... *B60W 10/08* (2013.01); *B60K 2006/4825* (2013.01); *F16H 2001/2881* (2013.01); *F16H 2200/2007* (2013.01); *Y02T 10/6221* (2013.01); *Y02T 10/6252* (2013.01)

(56) References Cited

U.S. PATENT DOCUMENTS

| | | | |
|---|---|---|---|
| 8,444,519 B2* | 5/2013 | Borntraeger | B60K 6/26 475/5 |
| 8,490,727 B2* | 7/2013 | Borntrager | B60K 6/387 180/65.22 |
| 9,212,734 B1* | 12/2015 | Kim | B60K 6/365 |
| 9,297,447 B2* | 3/2016 | Kim | F16H 37/046 |
| 2009/0050384 A1 | 2/2009 | Muller et al. | |
| 2011/0100736 A1 | 5/2011 | Borntrager et al. | |
| 2011/0224043 A1 | 9/2011 | Bachmann et al. | |

FOREIGN PATENT DOCUMENTS

| | | |
|---|---|---|
| DE | 10 2008 043 290 A1 | 5/2010 |
| EP | 1 396 369 B1 | 12/2009 |

OTHER PUBLICATIONS

German-language Written Opinion (PCT/ISA/237) issued in PCT Application No. PCT/EP2016/076492 dated Mar. 7, 2017 (five pages).

German-language Office Action issued in counterpart German Application No. 10 2015 223 118.6 dated Jul. 25, 2016 (four pages).

* cited by examiner

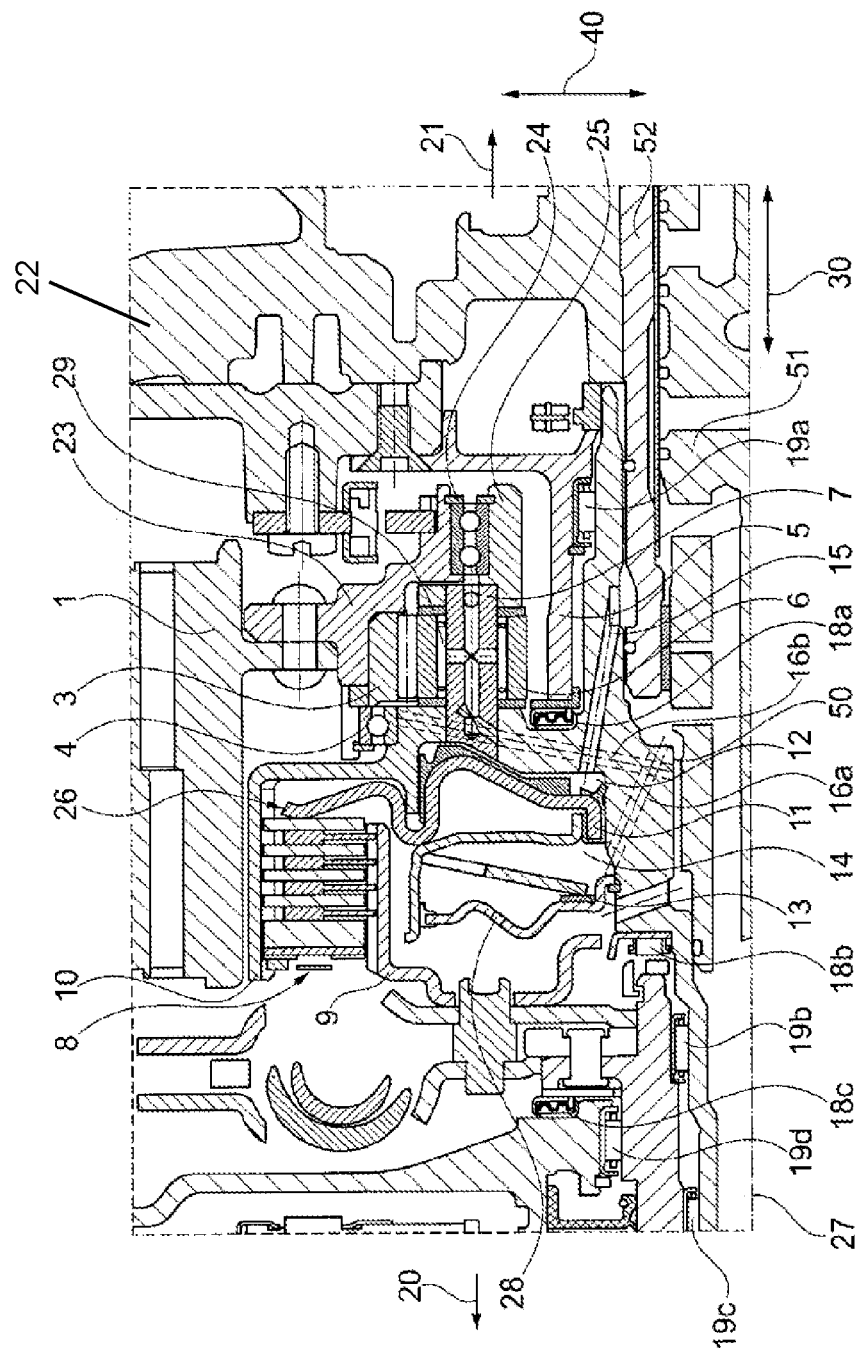

HYBRID DRIVE MODULE

CROSS REFERENCE TO RELATED APPLICATIONS

This application is a continuation of PCT International Application No. PCT/EP2016/076492, filed Nov. 3, 2016, which claims priority under 35 U.S.C. § 119 from German Patent Application No. 10 2015 223 118.6, filed Nov. 23, 2015, the entire disclosures of which are herein expressly incorporated by reference.

BACKGROUND AND SUMMARY OF THE INVENTION

The invention relates to a hybrid drive module. Such drive modules are known from the prior art, in particular, from DE 10 2008 043 290 A1.

The invention will be described below using the example of a hybrid vehicle and its drivetrain, and this is not to be understood as a restriction of the invention to such an application.

For a hybrid drive train in motor vehicles, at least one internal combustion engine and an electric drive machine are used for the separate or common drive of the vehicle. For these applications different combination possibilities of the drive machines with and without a transmission have been developed. Many combination possibilities have in common the fact that they are to be arranged within a small installation space and nevertheless must have a high level of operational reliability, and therefore the compactness of the drive becomes highly significant.

DE 10 2008 043 290 A1 proposes a hybrid drive module in which a planetary gear set (ring gear, sun gear, planetary gears and web) is arranged radially within the rotor of an electric drive machine. Here, the ring gear of this gear set can be coupled to the rotor, and the planetary gear carrier can be coupled to a clutch. The output from the hybrid drive module to a vehicle transmission, which is no longer a subject matter of the hybrid drive module, takes place via the sun gear.

An object of the invention is to specify a hybrid drive module with a compact design, and a drivetrain for a hybrid vehicle with such a drive module.

This and other objects are achieved by way of a hybrid drive module for a motor vehicle, and/or by a hybrid drivetrain train having such a hybrid drive module, in accordance with embodiments of the invention.

According to the invention, a hybrid drive module is to be understood as being a device which can be used in a motor vehicle for driving said motor vehicle and has a planetary gear stage with a sun gear, a ring gear, a planetary gear carrier and at least one planetary gear which is mounted so as to be rotatable with respect to the planetary gear carrier. The sun gear of this planetary gear stage can preferably be connected in a rotationally fixed fashion to the housing of the hybrid drive module, or is connected in a rotationally fixed fashion to the latter.

The at least one planetary gear or a plurality of planetary gears preferably mesh with the sun gear and the ring gear in order to transmit power. A planetary gear stage of at least two planetary gears which mesh with one another in order to transmit power can preferably also be provided, wherein the one planetary gear meshes with the ring gear, and the other planetary gear meshes with the sun gear.

According to an embodiment of the invention, the meshing of two gear wheels or the engagement of two gear wheels is to be understood as meaning that these two gear wheels roll one on the other. Planetary gear mechanisms in general are known from the prior art, and what are referred to as planetary gear mechanisms with minus gear sets are preferably used in conjunction with this hybrid drive module, since a good level of efficiency can be achieved in particular with said minus gear sets.

Furthermore, the hybrid drive module has an electric drive machine. The electric drive machine can preferably be operated in a plurality of operating quadrants, preferably at least in a motor operating quadrant and a generator operating quadrant. The electric drive machine is also preferably embodied as an electric motor/generator. Such an electric drive machine has, in particular, a rotor and a stator. In this context, the rotor is mounted so as to be rotatable with respect to the stator. The rotor and the stator also preferably are separated from one another by way of an air gap, wherein the efficiency of the transmission of energy from the stator to the rotor is dependent, in particular, on the size of this air gap, and, in particular, small air gaps are preferred. It results from this relationship that, in particular, the rotor should have a precise, preferably also rigid, bearing system with respect to the stator, in order preferably a small air gap between the rotor and the stator in the radial direction.

The rotor of the electric drive machine can preferably be connected in a torque-conducting fashion to the ring gear of the planetary gear stage. The rotor and the ring gear are also preferably at least partially connected to each other in a positively locking or frictionally locking or materially locking fashion. Furthermore, the hybrid drive module has a clutch which is configured to interrupt selectively the transmission of torque, preferably from an internal combustion engine to the planetary gear carrier. The clutch can therefore preferably be connected to the planetary gear carrier.

The hybrid drive module preferably has a structure in which the internal combustion engine can be connected selectively to the planetary gear carrier by way of a clutch in order to transmit the torque. The electric drive machine can also be coupled by way of its rotor to the ring gear of the planetary gear stage. The sun gear can be connected in a rotationally fixed fashion to the housing of the hybrid drive module or is mounted in a non-rotatable fashion with respect to said housing. The rotatable bearing system of the ring gear is preferably implemented on the planetary gear carrier, and the bearing system is therefore in particular loaded by low rotational speeds. The summing of the drive power which can be made available by the internal combustion engine and by the electric drive machine (rotor) to form a total power which can be output to a transmission input shaft, in particular of a shiftable transmission, takes place, that is to say, in particular, by way of the planetary gears or by way of the planetary gear carrier. In particular particularly advantageous operation of the electric drive machine is made possible by way of this configuration.

The ring gear is arranged geometrically in such a way that it is arranged at least partially in the radial and axial direction within the rotor of the electric drive machine. At least the toothing region of the ring gear, which is provided on one of the planetary gears in order to transmit movement, is preferably arranged at least partially in the radial and axial direction within the rotor, and this region is also preferably arranged completely within the rotor.

The sun gear of the planetary gear stage is preferably connected in a rotationally fixed fashion to the transmission housing, and the ring gear of the planetary gear stage is also preferably mounted with a ring gear bearing system on the planetary gear carrier so as to be rotatable with respect thereto. In particular, such a bearing system permits a particularly space-saving and, also preferably precise, design of the planetary gear stage, and in particular low rotational speed loading of the individual bearing systems also occurs.

In one preferred embodiment of the invention, the ring gear bearing system has a first and a second bearing system point which are spaced apart geometrically from one another, preferably in the axial direction. These bearing system points are also preferably arranged on different sides of the ring gear in the axial direction.

In one preferred embodiment, a coupling force can be applied in the axial direction to the clutch of the hybrid drive module. The clutch can be rotated, in particular, about a rotational axis, wherein this axis preferably also constitutes the rotational axis of the planetary gear stage, that is to say that axis about which the planetary gear carrier is rotatably mounted. According to the embodiment of the invention, "in the axial direction" signifies "in the direction of this rotational axis," and "in the radial direction" signifies "in an orthogonal direction with respect to this rotational axis."

The coupling force is preferably provided to control the clutch, in particular that is to say to transfer it from an operating state in which no torque can be transmitted by the clutch into a state in which torque can be transmitted. In this context, this coupling force can preferably be applied by a clutch piston. This clutch piston is preferably embodied as a cylindrical piston, and also preferably as a circular ring piston.

The clutch piston is also preferably arranged in the axial direction on the side of the clutch facing the planetary gear stage. The clutch piston is therefore arranged geometrically between the clutch piston and the planetary gear stage, with respect to the axial direction. In particular, such a configuration of the clutch and of the clutch piston permits a space-saving design thereof. The clutch is preferably arranged at least partially within the rotor of the electric drive machine in the radial direction, and is at least partially covered by the rotor in the axial direction. The clutch is also preferably embodied as a wet-running clutch, and transmission oil can preferably be fed thereto.

In one preferred embodiment of the invention, the clutch is embodied as a multi-disk clutch. The multi-disk clutch preferably has a radially inner and a radially outer clutch basket. These two clutch baskets can preferably be selectively connected to one another, in particular by applying the clutch force to the clutch disks, in order to transmit torque by way of friction in the faces of clutch disks. The radially outer clutch basket can preferably be connected in a torque-conducting fashion to the planetary gear carrier. The radially inner clutch basket is preferably configured to connect to a further drive machine, in particular an internal combustion engine.

In one preferred embodiment of the invention, at least the bearing system of the planetary gear carrier has at least one axial bearing or preferably a plurality of axial bearings. At least one of these axial bearings is preferably arranged geometrically in the axial direction between the sun gear, which is preferably arranged fixed to the housing, and the planetary gear carrier. In particular an axial force is applied to the planetary gear carrier by the application of the clutch force by the clutch piston. Said axial force is capable of being taken up, in particular, by such an axial bearing and therefore by the transmission housing with the result that these coupling forces are, in particular, not output to the internal combustion engine. The planetary gear carrier also preferably has three axial bearings which are spaced apart in the axial direction from one another.

In one preferred embodiment of the invention, a first piston space is formed between the clutch piston and the planetary gear carrier, and the clutch piston and the planetary gear carrier preferably bound this piston space at least partially and preferably completely. In this context, according to the invention the piston space is understood to be a hollow space which can be filled with a hydraulic medium in order to make available the piston force. The planetary gear stage also preferably has a pressurized oil duct. The pressurized oil duct is preferably configured to conduct a hydraulic medium, in particular transmission oil, into this piston space and as a result to apply pressure to the clutch piston and to make available the coupling force. In particular, a particularly space-saving design is made possible by the formation of the piston space between the clutch piston and the planetary gear carrier and the supply of pressurized oil through a pressurized oil duct which is made to extend to the planetary gear carrier.

In one preferred embodiment, a pump space is arranged on the side of the clutch piston facing away from the clutch space. The restoring spring for the hydraulic piston is preferably arranged in the pump space, and the latter can also be regarded as a centrifugal oil equalization space. A restoring force which opposes the coupling force can preferably be applied to the clutch piston by this restoring spring. The planetary gear carrier also preferably has a lubricant duct. This lubricant duct is preferably connected in a fluid-conducting fashion to the pump space, and also preferably to the ring gear bearing system and/or to the planetary gear bearing system.

The lubricant duct also preferably has outputs to the bearing system (planetary gear bearing system), of at least one of the planetary gears, on a planetary gear bolt in the planetary gear carrier. In particular, a particularly operationally reliable hybrid drive module can be represented by the active supply of lubricant via this pump space.

In one preferred embodiment, the EM rotor bearing system or ring gear bearing system or the planetary gear carrier bearing system or both are embodied as roller bearing systems and therefore preferably each have at least one roller bearing.

The planetary gear stage of the hybrid drive module is preferably configured in such a way that it has a stationary transmission ratio from a range which is greater than 1.25, preferably greater than 1.45 and particularly preferably greater than 1.55 and this range is also preferably smaller than 2, preferably smaller than 1.75 and particularly preferably smaller than 1.65. The stationary transmission ratio of the planetary transmission is particularly preferably at least 1.6.

In one preferred embodiment, the ring gear of the planetary gear stage can be connected to the rotor of the electric drive machine by way of a ring gear carrier. This ring gear carrier can preferably be connected to the rotor or to the ring gear or to both in a materially locking, preferably frictionally locking or particularly preferably positively locking fashion, or with a combination of at least two of the above-mentioned types of connection.

A hybrid drive train for a motor vehicle has at least one hybrid drive module according to an embodiment of the invention and an internal combustion engine. The internal combustion engine, or the output shaft of the internal combustion engine, can preferably be connected in a torque-conducting fashion to the clutch of the hybrid drive module. The hybrid drive train also preferably has a shiftable vehicle transmission which can be connected in a torque-conducting fashion to the planetary gear carrier of the hybrid drive module. The drive power which can be fed to this vehicle transmission can preferably be output to at least one driveable vehicle axle. The shiftable vehicle transmission preferably has different, preferably discrete, transmission stages, referred to as gear speeds. In particular, in a direction of the transmission of torque from the internal combustion engine to the driveable vehicle axle, the clutch of the hybrid drive module is arranged between the internal combustion engine and the planetary gear stage, and the hybrid drive module is also preferably arranged upstream of the shiftable vehicle transmission in the direction of transmission of torque.

In one preferred embodiment, the stator of the electric drive machine is accommodated in a transmission housing of the shiftable vehicle transmission. The shiftable vehicle transmission is also preferably embodied as an automatically shifting transmission or as an automatic transmission with at least two further planetary gear sets.

The transmission housing section in which the stator is accommodated and to which it is connected in a rotationally fixed fashion is also preferably embodied in one piece with the further transmission housing of the shiftable vehicle transmission.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a view of a longitudinal section through a hybrid drive module.

DETAILED DESCRIPTION OF THE DRAWING

FIG. 1 illustrates a longitudinal section through a hybrid drive module having an electric drive machine with a stator (not illustrated) and having a rotor 1. The stator is accommodated in a rotationally fixed fashion in the transmission housing 22 of the vehicle transmission (not illustrated). The rotor 1 is also connected to the ring gear 3 of the planetary gear stage by way of the ring gear carrier 23. The ring gear carrier 23 and therefore the ring gear 3 are mounted so as to be rotatable with respect to the planetary gear carrier 25 by way of the ring gear bearing system 4, 24. The ring gear bearing system 4, 24 has a first roller bearing 4 and a second roller bearing 24, and in this context these roller bearings 4, 24 are arranged on different sides of the ring gear 3 with respect to the axial direction 30. The ring gear 3 is also arranged within the rotor 1 both in the radial direction 40 and in the axial direction 30.

In order to transmit power, the ring gear 3 meshes with the planetary gear 6 which is mounted so as to be rotatable on the planetary gear bolt 7 and in the planetary gear carrier 25 by way of the planetary gear bearing system 29. The planetary gear 6 itself meshes with the sun gear 5 in order to transmit power. The planetary gear carrier 25 has an axial bearing 18a, b, c and a radial bearing 19a, b, c, with which said planetary gear carrier 25 is mounted so as to be rotatable with respect to the housing 22. In this context, the bearings 18a, b, c are embodied as axial roller bearings, and the bearings 19a, b, c as radial roller bearings.

The hybrid drive module is adjoined in the direction 21 by an automatic transmission (not illustrated), and the latter is provided for transmitting the drive power in the direction of at least one driveable vehicle axle (not illustrated). In order to transmit power, the clutch 8 can be coupled to an internal combustion engine in the direction 20. The clutch 8 has a radially inner clutch basket 9 and a radially outer clutch basket 10. The inner and outer clutch basket 8, 9 can be selectively connected by way of the clutch disks 26 in order to transmit torque.

In order to apply to the clutch disks 26 a coupling force by which the clutch disks 26 are compressed, a clutch piston 11 is provided which is embodied as an annular piston. In order to apply the clutch force, the piston space 12 can be filled with oil via the pressurized oil duct 15. If the force which is applied to the clutch piston 11 by this oil exceeds the restoring force applied by the restoring spring 13, the coupling force acts on the clutch disks 26.

The restoring spring 13 is arranged in the centrifugal oil equalization space 14. Transmission oil can be fed to the centrifugal oil equalization space 14 via the lubrication oil duct 16a. Transmission oil can also be made available in a non-pressurized fashion to the centrifugal oil equalization space by way of a relief notch on the internal diameter of the cover 28. Transmission oil for lubricating the ring gear bearing system 4 can be fed thereto via at least one oil duct 16b or a plurality thereof.

Furthermore, the oil duct 16b also makes it possible to lubricate the planetary gear bolt 7 and therefore the bearing system 29 of the planetary gears 6.

The hybrid drive module is arranged here at least essentially in a rotationally symmetrical fashion with respect to the rotational axis 27. Both the sun gear 5 and therefore the output in the direction 21 onto the automatic transmission as well as the clutch 8 are arranged coaxially with respect to the rotational axis 27.

The planetary gear carrier 25 can be connected in a rotationally fixed fashion to the transmission input shaft 51 by way of the shaft-hub connection 50. What is referred to as the converter support 52 serves to support the transmission input shaft 51 and to form the oil duct.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive module for a motor vehicle, comprising:
   a planetary gear stage including a sun gear, a ring gear, a planetary gear carrier, and at least one planetary gear which is mounted so as to be rotatable with respect to the planetary gear carrier, wherein, in order to transmit power, the planetary gear engages with the sun gear or the ring gear or with both; and
   an electric drive machine which has a stator and a rotor, wherein
   the ring gear is connectable in a torque-conducting fashion to the rotor, and the planetary gear carrier is connectable in a torque-conducting fashion to a clutch which is configured to interrupt transmission of torque to the planetary gear carrier,
   the ring gear is arranged at least partially within the rotor in a radial direction and in an axial direction,
   the planetary gear carrier is mounted with an axial bearing and a radial bearing so as to be rotatable with respect to a housing, and
   the ring gear is rotatably mounted on the planetary gear carrier with a ring gear bearing system.

2. The hybrid drive module according to claim 1, wherein
the ring gear bearing system includes a first bearing system point and a second bearing system point, and
the first and second bearing system points are arranged on different sides of the ring gear in the axial direction.

3. The hybrid drive module according to claim 1, wherein
a coupling force is appliable to the clutch in the axial direction,
the coupling force is appliable by way of a clutch piston, and
the clutch piston is arranged in the axial direction on a side of the clutch facing the planetary gear stage.

4. The hybrid drive module according to claim 2, wherein
a coupling force is appliable to the clutch in the axial direction,
the coupling force is appliable by way of a clutch piston, and
the clutch piston is arranged in the axial direction on a side of the clutch facing the planetary gear stage.

5. The hybrid drive module according to claim 1, wherein
the clutch is configured as a multi-disk clutch with a radially inner clutch basket and a radially outer clutch basket,
the radially outer clutch basket is connectable to the radially inner clutch basket via a plurality of clutch disks in order to transmit torque, and
the radially outer clutch basket is connectable to the planetary gear carrier.

6. The hybrid drive module according to claim 4, wherein
the clutch is configured as a multi-disk clutch with a radially inner clutch basket and a radially outer clutch basket,
the radially outer clutch basket is connectable to the radially inner clutch basket via a plurality of clutch disks in order to transmit torque, and
the radially outer clutch basket is connectable to the planetary gear carrier.

7. The hybrid drive module according to claim 1, wherein
in order to mount the planetary gear carrier has a plurality of axial bearings and a plurality of radial bearings, and
the plurality of axial bearings and the plurality of radical bearings are arranged between the planetary gear carrier and the housing of the hybrid drive module.

8. The hybrid drive module according to claim 6, wherein
in order to mount the planetary gear carrier has a plurality of axial bearings and a plurality of radial bearings, and
the plurality of axial bearings and the plurality of radical bearings are arranged between the planetary gear carrier and the housing of the hybrid drive module.

9. The hybrid drive module according to claim 3, wherein
a first piston space is formed between the clutch piston and the planetary gear carrier, and
the planetary gear carrier has a pressurized oil duct with which hydraulic pressure is appliable to the first piston space in order to generate the coupling force.

10. The hybrid drive module according to claim 8, wherein
a first piston space is formed between the clutch piston and the planetary gear carrier, and
the planetary gear carrier has a pressurized oil duct with which hydraulic pressure is appliable to the first piston space in order to generate the coupling force.

11. The hybrid drive module according to claim 9, wherein
a pump space is arranged on a side of the clutch piston facing away from the first piston space,
a restoring spring is arranged in the pump space, and
a restoring force which is directed counter to the coupling force is appliable to the clutch piston with the restoring spring.

12. The hybrid drive module according to claim 10, wherein
a pump space is arranged on a side of the clutch piston facing away from the first piston space,
a restoring spring is arranged in the pump space, and
a restoring force which is directed counter to the coupling force is appliable to the clutch piston with the restoring spring.

13. The hybrid drive module according to claim 11, wherein
the planetary gear carrier has a plurality of lubricant ducts,
the pump space is connectable in a fluid-conducting fashion to the plurality of lubricant ducts, and
the ring gear bearing system or the planetary gear bearing systems or both are connectable in a fluid-conducting fashion to the pump space in order to supply lubricant.

14. The hybrid drive module according to claim 12, wherein
the planetary gear carrier has a plurality of lubricant ducts,
the pump space is connectable in a fluid-conducting fashion to the plurality of lubricant ducts, and
the ring gear bearing system or the planetary gear bearing systems or both are connectable in a fluid-conducting fashion to the pump space in order to supply lubricant.

15. The hybrid drive module according to claim 1, wherein
the ring gear bearing system or the bearing system of the planetary gear carrier or both are configured as roller bearing systems and each have at least one roller bearing system.

16. The hybrid drive module according to claim 14, wherein
the ring gear bearing system or the bearing system of the planetary gear carrier or both are configured as roller bearing systems and each have at least one roller bearing system.

17. The hybrid drive module according to claim 1, wherein
the ring gear is connectable to the rotor by way of a ring gear carrier, with the result that the ring gear carrier is connectable to the rotor, on the one hand, and to the ring gear, on the other hand.

18. The hybrid drive module according to claim 2, wherein
the ring gear is connectable to the rotor by way of a ring gear carrier, with the result that the ring gear carrier is connectable to the rotor, on the one hand, and to the ring gear, on the other hand.

19. A hybrid drive train for a motor vehicle, comprising:
a hybrid drive module according to claim 1;
an internal combustion engine which is connectable in a torque-conducting fashion to the clutch of the hybrid drive module;
a shiftable vehicle transmission which is connectable in a torque-conducting fashion to the planetary gear carrier and to a driveable vehicle axle, wherein
in a direction of the transmission of torque from the internal combustion engine to the driveable vehicle axle, the clutch is arranged between the internal combustion engine and the hybrid drive module, and the hybrid drive module is arranged upstream of the shiftable vehicle transmission.

20. The hybrid drive train according to claim 19, wherein
the stator of the electric drive machine is accommodated in a transmission housing of the shiftable vehicle transmission, and
the shiftable vehicle transmission is configured as an automatic transmission with at least two further planetary gear stages.

\* \* \* \* \*